Feb. 20, 1968 V. D. MOCHEL 3,369,880
PROCESS FOR MAKING HUMIDITY SENSING DEVICE
Filed Dec. 22, 1964
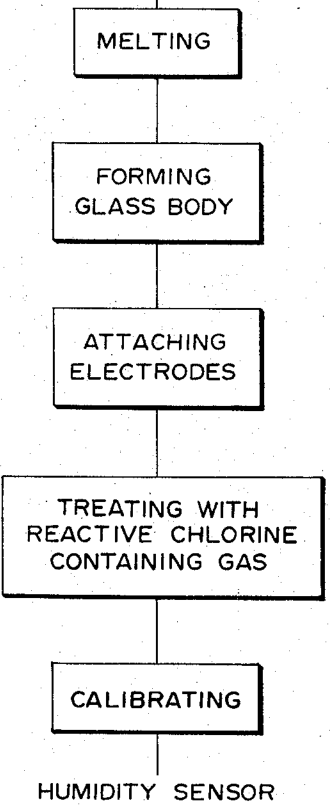
INVENTOR.
*Virgil D. Mochel*
BY *Gerhard K. Adam*
ATTORNEY 3,369,880

PROCESS FOR MAKING HUMIDITY SENSING DEVICE

Virgil D. Mochel, Corning, N.Y., assignor to Corning Glass Works, Corning, N.Y., a corporation of New York Filed Dec. 22, 1964, Ser. No. 420,384
8 Claims. (Cl. 65—30)

ABSTRACT OF THE DISCLOSURE

An improved method of making a humidity sensing device having a hygroscopic lithium chloride film on the surface of a glass substrate formed by means of a reaction between the lithum oxide of the glass together with a reactive chlorine containing gas.

This invention relates to humidity sensing devices. In one specific aspect it relates to an improvement in the method of forming a humidity sensitive film on a glass substrate.

The use of electric hygrometers, which depend upon variations in resistance, for the purpose of determining relative humidity is well known. The resistance element of the device is dependent upon the absorption or adsorption of moisture. Typical of such a device is the electric hygrometer described by F. W. Dunmore, J. Research, National Bureau of Standards, 20,723 (1938) R.P. 1102, in which two fine tinned copper wires were spirally wound on a thin-walled etched glass tube to form twenty bifilar turns per inch. After the glass tube was wound, it was coated with a dilute solution of lithium chloride in water. Lithium chloride was selected for its high degree of activity. It is a dry powder and a nonconductor below about 12% relative humidity but at higher humidity it takes up moisture from the atmosphere to become a conducting film. The resistance of this conducting film varies with humidity and temperature. The design of the hygrometer was subsequently improved by adding partially hydrolzed polyvinyl acetate to the lithium chloride solution. This bound the lithium chloride to the base glass and aided in the formation of a more even film. In addition it resulted in a reduction of the polarization set up by direct current flowing through the hygrometer.

For optimum resistance-relative humidity characteristics, the Dunmore hygrometer required three coils coated with 3%, 2%, and 1% lithium chloride solutions with polyvinyl acetate binder connected in parallel and with resistances in series with the 2% and 3% units. The three coil hygrometer was used in the U.S. Navy Radiosondes. Unfortunately, in the Radiosonde some disadvantages were high cost and difficulty in calibration accuracy.

The main problems in designing an electric humidity sensing device of the Dunmore type have been in making the electrode sensing element. The ideal full range sensing element should have a variable resistivity of about $10^7$ to $10^3$ ohms depending upon the moisture content of the atmosphere. In order to give accurate determinations it should have good reproducibility, a low hysteresis, a rapid response time, and low temperature variability. By the term, "low hysteresis" as used herein, I mean that the readings obtained should be approximately the same for a given relative humidity without being affected by prior conditions, that is, in recording a given relative humidity, it should make no difference whether the previous relative humidity was higher or lower than the final reading.

It is therefore, an object of the present invention to provide a resistor element which is responsive to variations in humidity.

It is a further object of the present invention to provide a method of making an electric hygrometer by the formation of a reaction film that has a variable resistance depending upon the extent of hydration of a hygroscopic film on the surface of a glass substrate.

In accordance with the present invention, I have discovered a method of making a humidity sensing apparatus by forming a glass body from a glass batch containing on the oxide basis 1.0 to 25 parts by weight of lithium oxide; treating the glass body with reactive chlorine containing gas at a temperature of about 450–614° C. for a time sufficient to form a lithium chloride film on the surface of the glass body; and attaching electrodes to the glass body such that a direct contact is made between the electrodes and the lithium chloride film.

Essentially the method involved reacting a glass composition containing lithium oxide with a reactive chlorine containing gas to produce a film of lithium chloride on the surface of the glass substrate. The electric resistor film is formed as illustrated by the equation:

$$Li_2O+HCl\rightarrow LiCl+H_2O$$

The lithium chloride film formed is extremely hygroscopic and will tend to form the monohydrate. It is suggested that the reaction is as follows:

$$LiCl+H_2O\rightarrow LiCl\cdot H_2O$$

The electric hygrometer may be considered to have two components. A humidity sensing device and an indicating apparatus. The present invention is directed primarily to the humidity sensing element and may be used in combination with any standard indicating apparatus, such as that described in Chemical Engineer's Handbook, McGraw-Hill (1950), 1299.

In the humidity sensing device to which the present invention is directed, as the relative humidity of the atmosphere increases apparently more lithium chloride monohydrate is formed causing the electrical resistance of the film to decrease. When the relative humidity is less than about 12%, the film is a nonconductor. The resistance of the film ranges from about a few thousand ohms for 100% relative humidity to approximately 6 to 10 megohms for about 15% relative humidity.

In making the novel humidity sensing device, the reaction requires the presence of lithium oxide in the base glass composition. A preferred glass is a lithium aluminosilicate glass which is comprised by weight on the oxide basis of 40 to 85% silica, 0–35% aluminum oxide, and 1.0–25% lithium oxide. Other useful glasses containing lithium oxide are borosilicate glass and lithium-lime glass.

The base glass composition may contain modifying oxides or other glass constituents, such as fining agents, as long as they do not interfere or contaminate the reaction film. Substances which may cause contamination of the coating and which are generally undesirable are the transition metal ions such as nickel, cobalt, copper, manganese, etc., and heavy metal ions such as lead which tend to decrease the diffusion rate of the lithium ions. Small amounts of sodium ions and greater amounts of the slowly diffusing potassium ions can be tolerated in the glass composition, but substantial amounts of these alkali metal ions should be avoided.

The lithium oxide content in the glass composition as determined on the weight percent on the oxide basis should range between 1.0 to 25% by weight. The amount of lithium oxide present in the glass composition may vary with the particular glass composition, the rate of diffusion of the lithium ion, and the melting temperature. Also one must consider the thickness of the lithium chloride film to be formed. In general, when the glass contains less than 1.0% by weight of lithium oxide, there is an insufficient amount of lithium chloride formed on the surface of the glass to give the desired properties; when the amount of lithium oxide in the glass is greater than 25%, the composition tends to devitrify on cooling and no longer has a glass structure.

The lithium chloride film is formed on the glass substrate by reacting a glass composition containing lithium oxide with a reactive chlorine containing gas. Reactive chlorine containing gases may be any gas containing a chlorine atom which is capable of reacting with the lithium oxide as illustrated by the equation above. These may be anhydrous or contain some water vapor. Particularly useful gases are hydrogen chloride and chlorine gas. While there must be a sufficient amount of chlorine present in the gas to react with the lithium ions present on the surface of the glass, it is possible to dilute the reactive gas with an inert gas, such as nitrogen. The reaction is preferably performed at atmospheric pressure in which the reactive chlorine containing gas is passed into a reactor which has been initially flushed with the reacting gas.

The reaction temperature should be in the range of about 450–614° C. with the preferred temperature being 475–525° C. It was found that at a temperature of about 400° C., the reaction rate between the lithium containing glass hydrogen chloride was so slow as to be of no practical use, whereas satisfactory results were obtained at temperatures of about 450° C. On the other hand, it is not desirable to exceed the melting point of the lithium chloride film formed which is about 614° C. At temperatures above 614° C. the lithium chloride begins to flow causing a nonuniform film to develop.

The film thickness on the glass substrate should be at least a monomolecular layer of lithium chloride. It is, for example, known that as the thickness of the film increases the electrical resistance correspondingly decreases. The thickness of the film is to a large extent determined by the rate of reaction and the time for which the reaction is permitted to occur. Typically, the reaction requires about five minutes to three hours.

The electrodes used in the present invention are those which are conventionally known in the art. They may be of the bifilar-wound coil design or of the grid design in which the form represents intermeshing fingers. While the metal from which the electrode portion is made may be conventionally copper, silver, or palladium, the preferred metal is platinium because these electrodes can be attached to the glass body prior to subjecting the glass to the chlorine containing gas without being undesirably corroded by the gas. It is important that good contact be made between the electrodes and the electrically resistive films. A preferred method of forming such a contact is by heating the glass until it becomes somewhat soft and pressing the electrode into the body of the glass. The distance between the electrodes, e.g., the number of turns per inch in the bifilar electrodes, may be determined experimentally for the particular apparatus being used. In general, moving the electrodes closer together steepens the resistance-relative humidity characteristics and moving the electrodes further apart flattens the characteristics.

The drawing represents a flow chart showing the various steps of the process of the invention.

A glass batch containing the required amount of the lithium compound, such as lithium carbonate, is melted at the proper temperature to give a uniform mass. The molten mass is cooled and formed to the shape of the glass body desired. Electrodes are attached to the glass body to make intimate contact therewith. A preferred method of attaching the electrodes is to place them on the surface of the glass body and pass an electric current through the electrodes causing them to become heated and imbedded in a glass body. Thereafter the glass is subjected to treatment with the reactive chlorine containing gas for a time sufficient to form a film of lithium chloride on the surface of the glass body. Alternatively, the glass may be subjected to the reactive chlorine containing gas prior to attaching the electrodes. However, this latter procedure may be undesirable if the electrodes are readily corroded by the reactive chlorine containing gas. It is now necessary to calibrate the humidity sensing element to accurately determine its resistance-relative humidity characteristics. In standardizing the humidity sensor, the thickness of the lithium chloride film may be either increased by repetition of the treatment with the reactive containing chlorine gas or decreased by dipping the electrode into an aqueous bath and removing a portion of the film.

My invention is further illusrated by the following examples:

*Example I*

A glass batch was melted in a platinum crucible for about 4 hours at a temperature of 1500° C. to form a glass composition which calculated in weight percent on the oxide basis is as follows:

| Ingredients: | Percent by weight |
|---|---|
| $SiO_2$ | 65 |
| $Al_2O_3$ | 25 |
| $Li_2O$ | 10 |

The glass was shaped and pulled to form a rod having a diameter of about 1/4 inch. The rod was then cooled and cut into pieces having a length of about 1 3/4 inches. A bifilar winding of platinum wire having a diameter of 5 mills was tightly wound around the glass core in the form of a spiral and was fastened at one end with epoxy resin. There were about 10 turns per inch of the double winding.

The sample was fired in a reaction tube in an atmosphere of anhydrous hydrogen chloride gas at a temperature of about 500° C. for three hours. The flow rate of the hydrogen chloride gas was at a rate of about 700 cubic centimeter per minute. The sensor was then removed from the reactor tube and permitted to cool.

The sensor element was calibrated by applying an alternating current voltage across the terminals of the electrodes using the indicating apparatus as described hereinabove. The changes in the resistance corresponding to the relative humidity of the surrounding atmosphere were then measured and these results were as follows:

| Relative humidity, percent | Resistance, kilohms |
|---|---|
| 10 | 50,000 |
| 30 | 1,400 |
| 50 | 200 |
| 70 | 50 |
| 98 | 11 |

The reproducibility of the results on successive relative humidity cycles was within plus or minus 3 1/2 percent relative humidity at the maximum deviation. The maximum hysteresis error was about plus or minus 5 percent relative humidity. Response times of the sensor was measured automatically recording the changes in resistance as a function of time when the sample was subjected to a change in the relative humidity level. As used herein the response time is defined as the time necessary for the resistance of the sensing element to change to 63 percent of the total relative humidity change. The response time for the sample over a step change of 67 percent to 98 percent relative humidity was 3 seconds for the adsorption and 6 seconds for desorption.

*Examples II–X*

Following the procedure of Example I, a representative series of glass sensing elements were prepared from lithium containing glass compositions as shown in the table below wherein the weight percents are given on the oxide basis:

GLASS COMPOSITIONS

| Example | II | III | IV | V | VI | VII | VIII | IX | X |
|---|---|---|---|---|---|---|---|---|---|
| Percent: | | | | | | | | | |
| $SiO_2$ | 50 | 65 | 55 | 60 | 75 | 69.7 | 71.7 | 64 | 68.5 |
| $Al_2O_3$ | 25 | 20 | 25 | 32 | 20 | 17.9 | 16.4 | 12 | 10.9 |
| $Li_2O$ | 25 | 10 | 10 | 8 | 5 | 2.6 | 4.0 | 12 | 15.2 |
| $B_2O_3$ | ---------- | 5 | 10 | ---------- | ---------- | ---------- | ---------- | ---------- | ---------- |
| $TiO_2$ | ---------- | ---------- | ---------- | 5 | 5 | 4.8 | 4.3 | ---------- | ---------- |
| ZnO | ---------- | ---------- | ---------- | ---------- | ---------- | 1.0 | 2 | ---------- | ---------- |
| $ZrO_2$ | ---------- | ---------- | ---------- | ---------- | ---------- | ---------- | 1 | 12 | 5.42 |
| F | ---------- | ---------- | ---------- | ---------- | ---------- | ---------- | 1 | ---------- | ---------- |
| $As_2O_3$ | ---------- | 0.5 | 0.5 | ---------- | ---------- | 0.9 | 0.5 | 0.5 | 0.5 |
| $Na_2O$ | ---------- | ---------- | ---------- | ---------- | ---------- | 0.3 | ---------- | ---------- | ---------- |
| $K_2O$ | ---------- | ---------- | ---------- | ---------- | ---------- | 0.1 | ---------- | ---------- | ---------- |
| MgO | ---------- | ---------- | ---------- | ---------- | ---------- | 2.8 | ---------- | ---------- | ---------- |

*Example XI*

Following the procedure of Example I and using the same glass composition with the exception that the reactive gas was changed to chlorine gas, a sensing element was prepared having a hygroscopic lithium chloride surface film.

*Example XII*

Following the procedure of Example I using the same glass composition, anhydrous hydrogen chloride gas was bubbled through an aqueous solution prior to the reaction. Similarly good results were obtained. This experiment indicates that the reactive chlorine containing gas need not be anhydrous.

I claim:

1. A method of making a hygroscopic film on the surface of the glass body comprising reacting a glass body, containing as calculated from the batch on the oxide basis 1.0–25 percent by weight of lithium oxide, with a reactive chlorine containing gas at a temperature of about 450–614° C. for a time sufficient to form a lithium chloride film on the surfaces of the glass body.

2. A method of making a hygroscopic film on the surface of a glass body comprising reacting a glass body, consisting essentially as calculated from the batch by weight on the oxide basis of 40–85 percent of silica, 0–35 percent of aluminum oxide and 1.0–25 percent of lithium oxide, with a reactive chlorine containing gas selected from the group consisting of hydrogen chloride and chlorine, at temperature of about 450–614° C. for a period of 5 to 180 minutes to form a lithium chloride film on the surface of the glass body.

3. A method according to claim 2 wherein said gas is hydrogen chloride.

4. A method according to claim 2 wherein said gas is chlorine.

5. A method of making a humidity sensing apparatus comprising the steps of:

(a) forming a glass body containing as calculated from the batch on the oxide basis 1.0–25 percent by weight of lithium oxide;

(b) treating the glass body with a reactive chlorine containing gas at a temperature of about 450–614° C. for a time sufficient to form a lithium chloride film on the surface of the glass body; and (c) attaching electrodes to the glass body such that a direct contact is made between said electrodes and said lithium chloride film.

6. A method of making a humidity sensing apparatus comprising the steps of:

(a) forming a glass body consisting essentially as calculated from the batch by weight on the oxide basis of 40–85 percent silica, 0–35 percent of aluminum oxide and 1.0–25 percent of lithium oxide;

(b) treating the glass body with a reactive chlorine containing gas selected from the group consisting of hydrogen chloride and chlorine, at a temperature of about 450–614° C. for a period of 5 to 180 minutes to form a lithium chloride film on the surface of the glass body; and (c) attaching a pair of electrodes to the glass body such that a direct contact is made between said electrodes and said lithium chloride film.

7. A method according to claim 6 wherein said gas is hydrogen chloride.

8. A method according to claim 6 wherein said gas is chlorine.

References Cited

UNITED STATES PATENTS

| | | | |
|---|---|---|---|
| 2,481,728 | 9/1949 | Dember | 338—35 |
| 2,533,246 | 12/1950 | Hayes et al. | 23—89 |
| 2,613,302 | 10/1952 | Gurewitsch | 338—35 |
| 2,662,809 | 12/1953 | Kroll | 23—89 X |
| 2,876,321 | 3/1959 | Amdur et al. | 338—35 |
| 3,001,918 | 9/1961 | Gzuha | 204—1.1 |

OTHER REFERENCES

Patent Abstract Ser. No. 205,167 Electrolytic Humidity Elements, O.G., vol. 674, p. 1367, Sept. 29, 1953.

DONALL H. SYLVESTER, *Primary Examiner.*

FRANK W. MIGA, *Examiner.*